May 9, 1961 R. F. LO PRESTI 2,983,364
TRAINING LINKAGE ASSEMBLY FOR A BELT CONVEYOR
Filed July 29, 1958 2 Sheets-Sheet 1
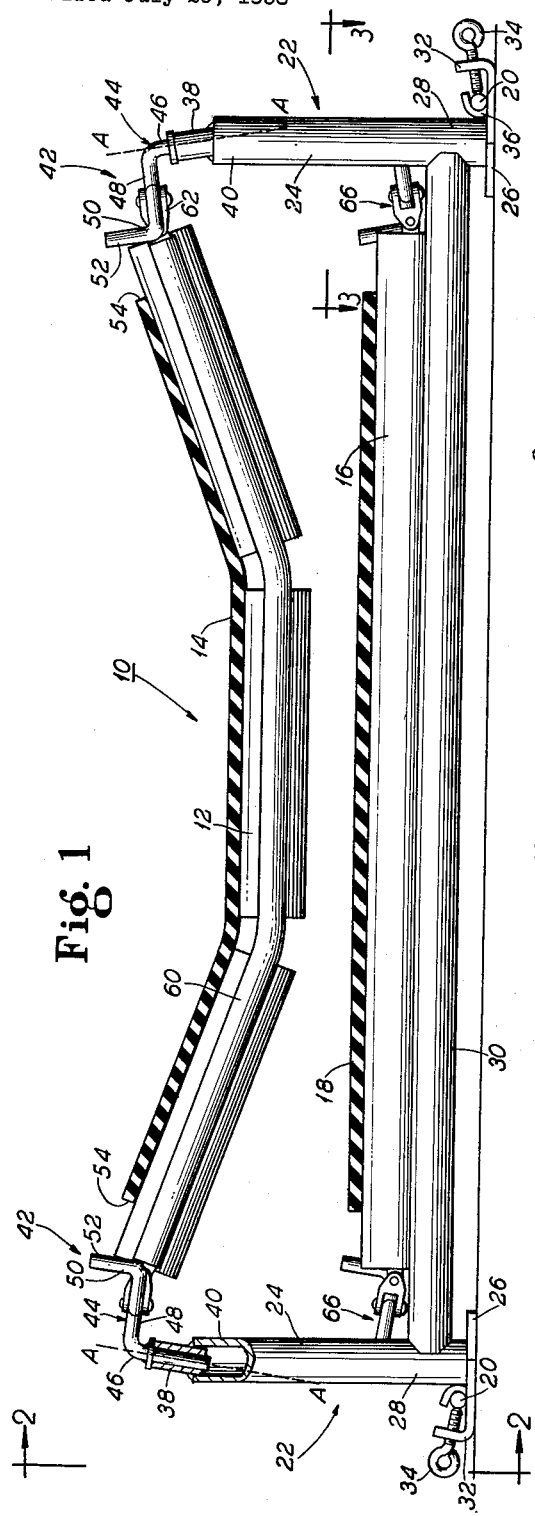
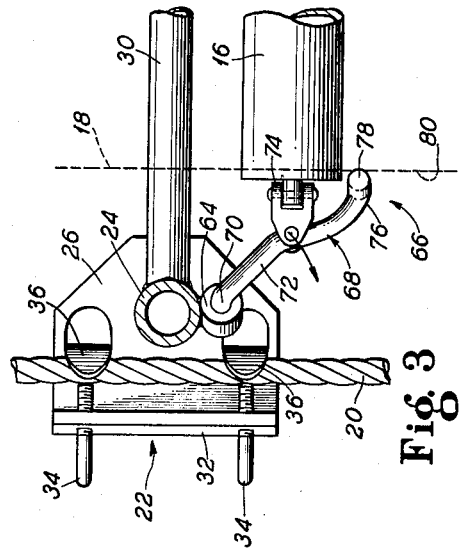
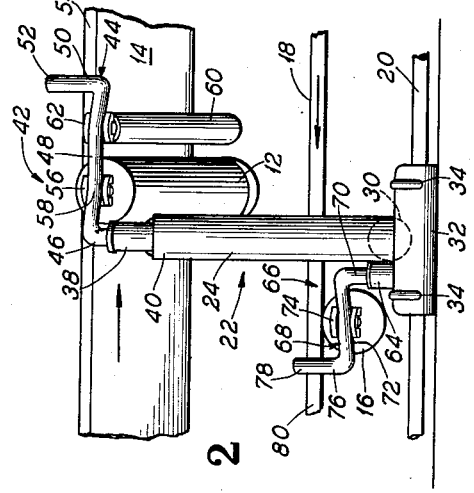
INVENTOR.
Roy F. LoPresti
BY
Murray A. Gleeson
ATTORNEY May 9, 1961 R. F. LO PRESTI 2,983,364
TRAINING LINKAGE ASSEMBLY FOR A BELT CONVEYOR
Filed July 29, 1958 2 Sheets-Sheet 2
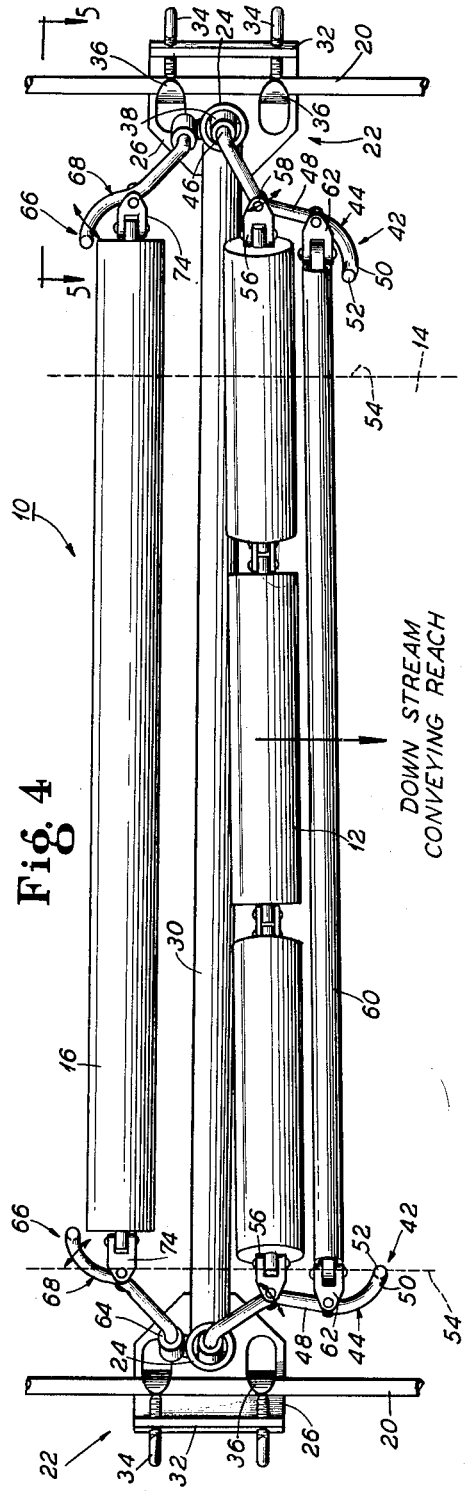
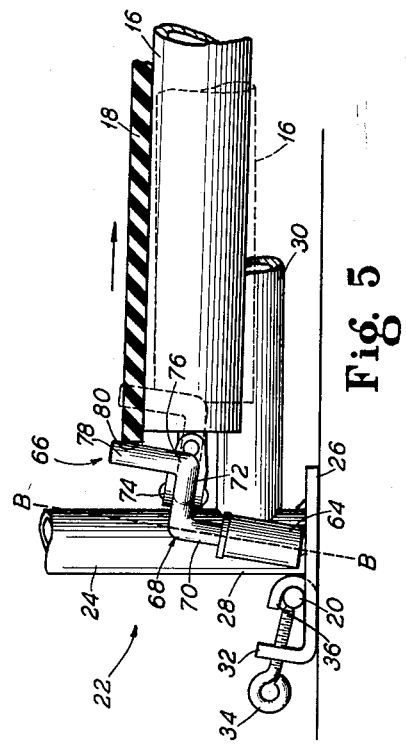
INVENTOR.
Roy F. Lo Presti
BY
Murray G. Gleeson
ATTORNEY

United States Patent Office 2,983,364
Patented May 9, 1961

2,983,364

TRAINING LINKAGE ASSEMBLY FOR A BELT CONVEYOR

Roy F. Lo Presti, Chicago, Ill., assignor to Goodman Manufacturing Company, Chicago, Ill., a corporation of Illinois Filed July 29, 1958, Ser. No. 751,698
6 Claims. (Cl. 198—202)

The present invention relates to conveyors and more particularly to an improved belt training linkage means for automatically positioning the troughing idler assemblies and the return roller assemblies of such conveyor so as to automatically train the conveyor belt back to center when it deviates therefrom.

Broadly, the invention relates to belt centering mechanism applicable to the upper, load-carrying conveying reach of the belt; to the return reach; or to both—and which works where headroom is low.

It is a primary object of the invention to provide improved linkage means for supporting a troughing idler assembly, or a return roller assembly, or both, in such a way that a conveyor belt, passing over the assembly offcenter, causes the assembly to swing in a direction to steer or train the conveyor belt back on center.

It is a further object of the present invention to provide an improved belt training linkage means for automatically positioning a flexible troughing idler assembly, or a return roller assembly, or both, of a conveyor, in such a manner that misalignment of the conveyor belt transversely offcenter from the prescribed longitudinal course will act to turn or cant the entire troughing or return assembly, as a unit, in a substantially horizontal direction so as to train, drive or steer the conveyor belt back to a prescribed centrally disposed longitudinal course.

It is a still further object of the present invention to provide an improved belt training linkage means for automatically positioning a troughing idler assembly or a return roller assembly, or both, in such a manner that misalignment of the conveyor belt transversely offcenter from the prescribed longitudinal course will act to lift an end portion of the associated assembly generally vertically upward in relationship to the opposite end portion thereof so as to enable a gravitational force or pull to assist the conveyor belt back to the prescribed centrally disposed longitudinal course.

In order to accomplish the above stated objects, there is provided an improved belt training linkage means for pivotally connecting and positioning a troughing idler assembly or a return roller assembly, or both, of the conveyor with respect to transversely spaced support stands so that offcenter transverse movement of the conveyor belt will automatically turn or cant the longitudinal axis of the entire assembly relative to the longitudinal movement of the conveyor belt in a generally horizontal plane so as to train, drive or steer the belt back toward center; further, the offcenter transverse movement of the conveyor belt may simultaneously, automatically, generally vertically lift the end portion of the associated assembly that is nearest the edge portion of the offcenter belt so as to make such edge portion higher than the opposite edge portion thereof to create a gravitational pull enabling the weight of the offcenter belt to assist in training the conveyor belt back toward the prescribed centrally disposed longitudinal course.

Other objects and important features of the invention will be apparent from a study of the specification following taken with the drawing, which together show and describe a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawing:

Fig. 1 is a cross sectional view of a conveyor employing the automatic belt training features of the present invention;

Fig. 2 is a partial side view of Fig. 1 taken in the direction of the arrows 2—2;

Fig. 3 is a fragmentary cross sectional plan view of the Fig. 1 taken along the line 3—3 looking in the direction of the arrows;

Fig. 4 is a plan view of Fig. 1 with the conveyor belt removed, and

Fig. 5 is an enlarged fragmentary sectional view of Fig. 4 taken along the line 5—5 looking in the direction of the arrows and illustrating how an edge portion of a conveyor belt carried on the return assembly is lifted incidental to the training operation.

Referring now to Figs. 1 and 4 of the drawing, there is shown a portion of a conveyor 10 comprising an elongated flexible troughing idler assembly 12 supporting a conveying reach 14 of a conveyor belt, an elongated relative rigid return roller assembly 16 supporting a return reach 18 of the conveyor belt, flexible strand means 20—20 and a supporting stand means 22. It is to be understood that a plurality of the supporting stand means 22 are disposed transversely across the given course of the conveyor 10 at longitudinally spaced intervals therealong and serve to provide the structure for supporting the flexible troughing assemblies 12, the return idler assemblies 16 and the strand means 20—20 in substantially fixed alignment relative to each other.

Each of the supporting stand means 22 includes, a pair of generally vertically upstanding elongated tubular support members 24—24 disposed in transversely spaced relationship relative to the given course of the conveyor 10, a generally horizontally disposed base plate member 26 is secured, as by welding, to the lower end portion 28 of each support member 24 and a generally horizontally disposed relatively rigid elongated main stand tie bar 30 is secured, adjacent the end portions thereof, to the lower end portions 28 of the respective support members 24—24 in order to retain the support members in the desired position.

The transversely outer or outboard edge portion 32 of each base plate member 26 is turned generally vertically upwardly and is provided with a pair of longitudinally spaced screw clamp members 34—34 which cooperate with longitudinally spaced tanges 36—36 formed in the base plate member 26 to clamp the respective strand means 20 to the base plate members 26 of the support members 24—24 in order to maintain the supporting stand means 22 in the desired longitudinally spaced relative positions with the strand means 20 acting primarily as guy means for maintaining the stand means 22 in the generally vertically upstanding position along the course of the conveyor 10.

A support bushing 38 is secured, as by welding, to the upper end portion 40 of each support member 24 with each bushing 38 being disposed with the longitudinal axis thereof being non-parallel and tilted generally inwardly relative to the longitudinal axis of the associated support member 24 with each bushing 38 being tilted to the vertical and extending generally horizontally inwardly and generally vertically upwardly relative to the given course of the conveyor 10, as best illustrated in Fig. 1.

In order to enable the troughing idler assembly 12 to be automatically positioned so that the troughing assembly will train, steer or drive the conveying reach 14 of the conveyor belt along the prescribed longitudinally centrally disposed true course, there is provided a belt training linkage means 42 for connecting and positioning the end portions of the troughing assembly 12 to the adjacent support members 24—24.

Each of the linkage means 42 comprises an elongated linkage lever member 44 having one end portion 46 pivotally mounted in the respective support bushing 38 with the end portion 46 being disposed substantially normal to an intermediate portion 48 of the lever member 44 with the one end portion 46 extending generally downwardly relative to the intermediate portion 48. The one end portion 46 of each lever member 44 defines a pivotal axis A—A, note Fig. 1, which is substantially common to the longitudinal axis of the respective support bushing 38 so that the pivotal movement of the other end portion 50 of each lever member 44, note the arrows in Fig. 4, will be transversely outwardly-upwardly and transversely inwardly-downwardly relative to the given course of the conveyor 10.

Each of the linkage lever members 44 extend from the respective one end portion 46 generally longitudinally downstream in the direction of travel of the conveying reach 14 across the troughing assembly 12 and generally transversely inwardly relative to the given course of the conveyor 10, note Fig. 4, with the intermediate portion 48 of each lever member 44 being curved generally transversely inwardly relative to the given course intermediate the end portions 46 and 50.

The other end portion 50 of each lever member 44 is disposed substantially normal to the curved intermediate portion 48 and extends generally upwardly therefrom to define a belt engaging means 52 for engaging the adjacent side edge portions 54 of the conveying reach 14 when the conveying reach is in an extreme longitudinally offcenter position; as illustrated by dotted lines in Fig. 4.

The troughing assembly 12 is pivotally attached adjacent each end portion thereof to the curved intermediate portions 48 of the transversely opposed lever members 44 by pivot means 56 which are located at the most extreme transversely inwardly curved parts 58 of the intermediate portions 48.

An elongated relatively rigid auxiliary tie rod 60 may also be pivotally attached adjacent each end portion thereof to the lever members 44 by pivot means 62 which are positioned intermediate the pivot means 56 and the other end portions 50 and in a downstream spaced relationship, in the direction of travel of the conveying reach 14, to the pivot means 56 with the auxiliary tie rod 60 extending generally transversely relative to the given course of the conveyor 10 in substantially parallel relationship to the troughing assembly 12.

The same general linkage principle, with slight modification in structure as described above, is also utilized to connect and position the return assembly 16 in a downstream direction relative to the travel of the return reach thereacross to automatically train, drive or steer the return reach 18 of the conveyor belt and, for this purpose, there is provided a lower support bushing 64 affixed to the downstream side, relative to the direction of travel of the return reach 18, of each support member 24 adjacent the lower end portion 28 thereof with each of the lower support bushings 64 pivotally supporting a belt training linkage means 66 for the return assembly 16. The lower support bushings 64 are tilted at an attitude that is generally vertically inwardly relative to the given course of the conveyor 10 with the longitudinal axes of the lower support bushings 64 being substantially parallel to the longitudinal axes of the support bushings 38.

A lower linkage lever member 68, similar to the linkage lever members 44, is pivotally supported in each of the lower support bushings 64 and extends generally longitudinally downstream in the direction of travel of the return reach 18 of the conveyor belt and generally transversely inwardly relative to the given course of the conveyor 10, note Fig. 4. It is to be noted that the lower lever members 68 are similar in configuration to the lever members 44 with the lower lever members 68 having one end portion 70 pivotally mounted in the respective lower support bushing 64 for swinging movement of the lever member 68 about the tilted pivotal axis B—B, note Fig. 5, a curved intermediate portion 72 having the return assembly 16 pivotally secured thereto by a pivot means 74 and the other end portion 76 defining a belt engaging means 78 for engaging the adjacent side edge portions 80 of the return reach 18 of the conveyor belt when the return reach is in an extreme longitudinally offcenter position, as illustrated in Figs. 3 and 5.

It is to be noted that the linkage means 42 and 66 are both positioned downstream relative to the direction of travel of the associated reach of the conveyor belt; i.e. the linkage means 42 is located downstream relative to the movement of the conveying reach 14 and the linkage means 66 is located downstream relative to the movement of the return reach 18.

In operation, the linkage means 42 and 66 are substantially identical and for the sake of brevity only the operation of the linkage means 42 will be described. In operation, the belt training linkage means 42, enables each troughing assembly 12 to be positioned and supported by the boomerang shaped connecting linkage lever members 44 which extend generally longitudinally downstream in the direction of travel of the conveying reach 14 and generally transversely inwardly relative to the given course of the conveyor 10 and are pivotally mounted atop the pair of tubular support members 24—24 which are substantially rigidly transversely spaced by the main tie bar 30. The boomerang shaped connecting linkage lever members 44 have the intermediate portions 48 thereof curved transversely inwardly of the given course of the conveyor 10 and the troughing assembly 12 is pivotally connected by pivot means 56 to the most inwardly curved part 58 of the intermediate portions 48. By disposing the support bushings 38 and the one end portions 46 of the lever members 44 so that the pivotal axes A—A for the lever members 44 are tilted to the vertical transversely inwardly relative to the given course of the conveyor 10 the other free end portions 50 of the lever members 44 will swing generally transversely outwardly-upwardly and generally transversely inwardly-downwardly and, as best illustrated in dotted lines in Fig. 4, offcenter movement of the conveying reach 14 of the conveyor belt will cant the longitudinal axis of the troughing assembly 12 relative to the given course of the conveyor 10 in such a direction as to train, drive or steer the conveying reach 14 back to the prescribed central course.

Further, the particular inclined swinging movement of the other end portions 50 of the lever members 44 may also position the end portion of the associated troughing assembly 12 that is nearest the edge portion of the conveying reach 14 which has moved furthest transversely outwardly offcenter to be generally vertically upwardly positioned relative to the opposite end portion of the associated troughing assembly so that a gravitational force or pull will assist the conveying reach 14 back to the prescribed centrally disposed longitudinal course.

The belt training linkage means 66, as shown in Fig. 3, is similar to the linkage means 42 with the basic difference between the linkage means 42 and 66 being that in the linkage means 42 which positions the flexible troughing assembly 12 there is provided the relatively rigid auxiliary tie bar 60 since the troughing assembly 12 is flexible. There is no need for such auxiliary tie bar in the linkage means 66 since the return assembly 16 is sufficiently rigid. It is to be understood that in a troughing assembly 12 which is not flexible that there is no need for an auxiliary tie bar such as the tie bar 60.

The particular swinging movement of the lever members 44 and 68 is best illustrated in Fig. 5 wherein the transversely outwardly-upwardly swinging movement of the lever member 68 is shown in solid lines with the associated end portion of the return assembly 16 being upwardly positioned and the belt engaging means 78 engaging the adjacent side edge portion 80 of the return reach 18 with the normal position of the lever member 68 and return assembly 16, when the return reach 18 is running centered thereacross, being shown in dotted lines. It is to be noted that the return assembly 16 may be lifted vertically at the one end portion thus making the side edge portion 80 of the return reach 18, which is running offcenter, higher than the opposite side edge portion and will subject the offcenter return reach 18 to a gravitational force or pull tending to slide the return reach 18 down the return assembly 16, in the direction of the arrow in Fig. 5, to a central location. A similar gravitational force or pull, as illustrated in Fig. 5, may be exerted on the conveying reach 14 through the linkage means 44 when the conveying reach moves transversely offcenter across the troughing assembly 12. In both cases, the gravitational force or pull on the respective reaches 14 and 18 tends to help train the conveyor belt along the prescribed course.

While the invention has been described in terms of an embodiment which it has assumed in practice, the scope of the invention should not be deemed to be limited by the precise embodiment herein shown, such other embodiments being intended to be reserved especially as they fall within the scope of the claims herein appended.

I claim as my invention:

1. In a belt conveyor having support means, elongated flexible troughing assemblies supporting a conveying reach of a conveyor belt for movement thereacross along a given course, elongated relatively rigid roller assemblies supporting a return reach of the conveyor belt for movement thereacross along the given course, belt training linkage means for positioning said troughing assemblies and roller assemblies relative to the given course to train the conveying reach and return reach, respectively, said linkage means including an elongated lever member pivotally connected intermediate the end portions thereof to an end portion of each of the assemblies, pivot means pivotally connecting one end portion of each lever member to the support means for swinging movement of the other end portion thereof about an axis that is tilted to the vertical generally inwardly relative to the given course with the other end portion of each lever member swinging generally transversely inwardly-downwardly and generally transversely outwardly-upwardly relative to the given course, the other end portion of each lever member being generally upwardly turned and defining conveyor belt engaging means for engaging the adjacent side edge portion of the conveyor belt when the conveyor belt is longitudinally offcenter relative to the given course, and an elongated substantially rigid tie bar extending between and pivotally connected adjacent each end portion thereof to the respective other end portion of the lever members that are pivotally connected to the flexible troughing assemblies.

2. A troughing idler assembly for automatically training a conveyor belt in a flexible belt conveyor in response to movement of the belt thereacross in a detrained condition, said troughing idler assembly including a pair of lever members having generally horizontally axised portions and means for supporting each of the lever members for rotation about an upwardly and transversely inwardly directed axis, said generally horizontally axised portions being inclined forwardly and inwardly with respect to the direction of belt travel, a roller assembly and means for pivotally connecting the roller assembly to the generally horizontally axised portions of the lever members whereby generally transverse inward movement of one lever member induces an opposite, generally transversely outward and upward movement of the other lever member.

3. The idler assembly of claim 2 further including means for maintaining the ends of the roller assembly a substantially fixed distance apart.

4. The idler assembly of claim 2 further characterized in that the roller assembly is a return roller.

5. A troughing idler assembly for automatically training a conveyor belt in a flexible belt conveyor in response to passage of the belt thereover in a detrained condition, said assembly including a roller assembly having a plurality of rollers interconnected for flexure with respect to one another in a generally vertical plane, a pair of generally horizontally disposed lever members, means for supporting each of the lever members for rotation about an upwardly and transversely inwardly directed axis, means for pivotally connecting the end portions of the roller assembly to the generally horizontally disposed lever members to thereby enable the end portions of the roller assembly to swing in a plane generally parallel to the plane in which said generally horizontally disposed portions swing, and an elongated spreader member of a substantially fixed length pivotally connected to said horizontal portions of the lever members whereby inward swinging of one lever member in response to detraining of a belt induces a corresponding generally outward and upward movement of the other lever member to thereby skew the roller assembly into a belt retraining position.

6. The troughing idler assembly of claim 5 further characterized in that the means for supporting each of the lever members includes a substantially rigid, generally upright support structure for each lever member, the lower end of which is constructed and arranged to be secured to a flexible sideframe substantially at ground level, each of said lever members being pivotally carried by the upper end portion of a corresponding support structure.

References Cited in the file of this patent

UNITED STATES PATENTS

| 2,132,053 | Sollenberger et al. | Oct. 4, 1938 |
| 2,451,394 | Klein | Oct. 12, 1948 |
| 2,805,763 | McCallum | Sept. 10, 1957 |

FOREIGN PATENTS

| 618,019 | Great Britain | Feb. 15, 1949 |